United States Patent Office 3,264,353
Patented August 2, 1966

3,264,353
TOLYLENE DIAMINE COMPOSITIONS STABILIZED WITH N-BUTYL ACID PHOSPHATE
Eugene L. Powers, New Martinsville, W. Va., assignor to Mobay Chemical Company, Pittsburgh, Pa., a corporation of Delaware
No Drawing. Filed Mar. 22, 1965, Ser. No. 441,889
6 Claims. (Cl. 260—578)

This invention relates to the stabilization of aromatic amines, and more particularly to the stabilization of tolylene diamine against deterioration and discoloration. This application is a continuation-in-part of my copending application Serial No. 210,218, filed July 16, 1962, now abandoned.

The tolylene diamines are used in great quantities as starting materials in the manufacture of diisocyanates as well as in many other chemical systems leading to the production of synthetic resins and plastics such as polyurethanes. These tolylene diamines are normally substantially colorless when first prepared, but are found to darken quite rapidly during storage when exposed to light and/or elevated temperatures and/or air. The darkening phenomenon obviously detracts from the desirability of these compounds, particularly with regard to some end uses.

Various means have been suggested to overcome the problem of darkening or aromatic amines, most of which suggestions involve the addition of organic or inorganic stabilizer to the amines.

Though some of the previously suggested stabilizers have been found to be fairly effective in inhibiting discoloration of some types of organic amines during storage, most of these suggested stabilizers have been found to be ineffective or of questionable value when used with tolylene diamines.

It is an object of the present invention to provide compositions comprising essentially tolylene diamines or mixtures thereof having improved stability. Another object of this invention is to provide a process for inhibiting discoloration of tolylene diamines or mixtures thereof.

The foregoing objects and others are accomplished in accordance with the invention, generally speaking, by providing tolylene diamine stabilized with a member selected from the group consisting of alkyl acid phosphate, dialkyl acid phosphate and mixtures thereof wherein said alkyl group has from 1 to 10 carbon atoms.

The tolylene diamines include 2,3-, 2,4-, 2,5-, 2,6-, 3,4- and 3,5-tolylene diamines.

As has been stated, the stabilized compositions may also comprise mixtures of two or more tolylene diamines. A particularly preferred composition is one comprising a mixture of 2,4-tolylene diamine and up to about 40% by weight of 2,6-tolylene diamine. More particularly, preferred compositions of this type are those comprising a mixture of 80% 2,4-tolylene diamine and 20% 2,6-tolylene diamine or 65%, 2,4-tolylene diamine and 35% 2,6-tolylene diamine.

It has been found that the above-discussed tolylene diamine compositions are rendered substantially more stable against discoloration during storage by adding thereto a small amount of an alkyl acid phosphate. In general, alkyl acid phosphates have been found to be excellent stabilizers when used in various amounts up to about 5% by weight based on the weight of the tolylene diamines. It is preferred to use from about 0.1% to about 1% by weight of the stabilizers, and most preferably at least 0.5% by weight.

Any suitable alkyl acid phosphate, dialkyl acid phosphate or mixtures thereof may be used in the amounts set forth above. Suitable alkyl acid phosphates are n-amyl acid phosphate, n-hexyl acid phosphate, isopropyl acid phosphate, methyl acid phosphate, n-propyl acid phosphate, n-octyl acid phosphate, ethyl acid phosphate, tetrabutyl acid phosphate, 2-methyl butyl acid phosphate, n-heptyl acid phosphate, n-nonyl acid phosphate, n-decyl acid phosphate and the like. Any suitable dialkyl acid phosphate may be used such as dimethyl acid phosphate, diethyl acid phosphate, di-n-propyl acid phosphate, di-n-amyl acid phosphate, di-n-butyl acid phosphate, di-n-hexyl acid phosphate, diisopropyl acid phosphate, di-n-decyl acid phosphate, ethyl, butyl acid phosphate, methyl, decyl acid phosphate and the like.

The tolylene diamines are well known and used to prepare organic isocyanates which are in turn used to prepare cellular polyurethane plastics, for example useful as foam cushions and the like.

The invention is further illustrated by the following examples in which parts are by weight unless otherwise specified.

*Example 1*

In this example, samples were tested wherein approximately 500 cc. of a mixture of approximately 80% 2,4-tolylene diamine and 20% 2,6-tolylene diamine was introduced into one liter flasks. Air was excluded above the tolylene diamine mixture by flushing and blanketing with nitrogen gas after which 0.5% of n-butyl acid phosphate was mixed with the liquid in each flask. The flasks were thereafter sealed and some were stored at room temperature (about 25° C.) in the light while others were stored at 50° C. in the dark. After twenty-seven days it was found that the samples stored in light at 25° C. had become light brown in color, while the samples stored at 50° C. in the dark were an even lighter brown. Control samples containing no stabilizer turned dark brown after one day under the same conditions.

*Example 2*

The same procedure as described above in connection with Example 1 when carried out with a tolylene diamine mixture comprising 65% 2,4-tolylene diamine and 35% 2,6-tolylene diamine, produces substantially the same results.

*Example 3*

In this example approximately 500 ml. of a mixture of 80% 2,4- and 20% 2,6-tolylene diamine was introduced into a one liter flask. Air was excluded by flushing and blanketing the tolylene diamine with nitrogen gas and about 0.5% by weight of a mixture of n-amyl acid phosphate and di-n-amyl acid phosphate mixed in such proportions that it contained about 36% $P_2O_5$ and had a specific gravity at 25° C. and 1.10 was added. The flask is sealed and stored at room temperature at 25° C. for two days, in sunlight. Very little discoloration was noted whereas identical samples with no acid phosphate stabilizer turn dark brown after one day under the same conditions.

*Example 4*

Example 1 is repeated except that a mixture of n-butyl acid phosphate and di-n-butyl acid phosphate which contains about 39% $P_2O_5$ and has the specific gravity 1.12 at 25° C. is used. Essentially the same results are obtained.

*Example 5*

Example 1 is repeated except that dimethyl acid phosphate is used. The tolylene diamine shows very little discoloration after storage.

There has been described above means for stabilizing tolylene diamines and mixtures thereof against discoloration by incorporating therewith a small portion of n-butyl acid phosphate as a stabilizer. From the examples, it is apparent that the stability of such compositions is far greater than is the case when no inhibitor is present, even though the control composition be stored under a blanket of nitrogen and in the dark.

Obviously, many modifications and variations of the present invention are possible in the light of the above teachings. It is, therefore, to be understood that within the scope of the appended claims, the invention may be practiced otherwise than as specifically described.

Although the invention has been described in considerable detail for the purpose of illustration, it is to be understood that variations can be made by those skilled in the art without departing from the spirit of the invention and scope of the claims.

What is claimed is:

1. A composition having improved stability against discoloration comprising tolylene diamine and containing from about 0.1% to about 5.0% by weight of a member selected from the group consisting of an alkyl acid phosphate and a dialkyl acid phosphate, said alkyl group in each instance having from 1 to 10 carbon atoms.

2. A composition having improved stability against discoloration comprising tolylene diamine and having from about 0.1% to about 5.0% of n-butyl acid phosphate.

3. A composition according to claim 2 wherein said n-butyl acid phosphate is present in a quantity of at least 0.5% by weight.

4. A composition according to claim 2 wherein said composition comprises a mixture of about 80% 2,4-tolylene diamine and about 20% 2,6-tolylene diamine.

5. A composition according to claim 2 containing a mixture of about 65% 2,4-tolylene diamine and about 35% 2,6-tolylene diamine.

6. A composition having improved stability against discoloration comprising a mixture of 2,4-tolylene diamine with up to about 40% 2,6-tolylene diamine having added thereto 0.1 to 5.0% of n-butyl acid phosphate.

No references cited.

CHARLES B. PARKER, *Primary Examiner.*

D. R. MAHANAND, *Assistant Examiner.*